(12) United States Patent
Quirion

(10) Patent No.: US 7,026,772 B2
(45) Date of Patent: Apr. 11, 2006

(54) POSITION SENSORLESS DRIVE FOR PERMANENT MAGNET SYNCHRONOUS MOTORS

(75) Inventor: Jean Quirion, Upper Tantallon (CA)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/035,336

(22) Filed: Jan. 13, 2005

(65) Prior Publication Data

US 2005/0151502 A1    Jul. 14, 2005

Related U.S. Application Data

(60) Provisional application No. 60/622,440, filed on Oct. 27, 2004, provisional application No. 60/536,566, filed on Jan. 14, 2004.

(51) Int. Cl.
  *H02P 6/18* (2006.01)

(52) U.S. Cl. .................................. 318/254; 388/911

(58) Field of Classification Search ................ 318/138, 318/254, 439, 720–724; 388/911
See application file for complete search history.

(56) References Cited

U.S. PATENT DOCUMENTS

| | | | | |
|---|---|---|---|---|
| 5,998,946 A | * | 12/1999 | Kim ........................... | 318/254 |
| 6,163,127 A | * | 12/2000 | Patel et al. .................. | 318/700 |
| 6,552,509 B1 | * | 4/2003 | Veltman ..................... | 318/807 |
| 6,831,439 B1 | * | 12/2004 | Won et al. .................. | 318/701 |

* cited by examiner

*Primary Examiner*—Bentsu Ro
(74) *Attorney, Agent, or Firm*—Ostrolenk, Faber, Gerb & Soffen, LLP

(57) ABSTRACT

A sensorless motor control algorithm that single-handedly permits operation over the entire speed range from low speed to high speed. This "fusion" algorithm seamlessly fuses the position data generated respectively by high speed and low speed sensorless algorithms. The resulting sensorless drive permits effective position sensorless operation over the entire speed range of a PM motor.

28 Claims, 14 Drawing Sheets

POSITION SENSORLESS DRIVE FOR PERMANENT MAGNET SYNCHRONOUS MOTORS

CROSS-REFERENCE TO RELATED APPLICATIONS

This application is based upon and claims priority of U.S. Provisional Application Ser. No. 60/536,566 filed Jan. 14, 2004, and Ser. No. 60/622,440 filed Oct. 27, 2004, the disclosures of which are incorporated by reference.

BACKGROUND OF THE INVENTION

Permanent magnet (PM) motors appear to be gaining momentum in industry. This is due to their increased efficiency and small size, which owes to the presence of a permanent magnet in the rotor. In particular, PM motors with sinusoidal back-EMF are of interest because they produce much less torque ripple than their trapezoidal back-EMF equivalents. Synchronous motors have generally included a position sensor to support position-based control algorithms. Given the apparent increasing market demand for this type of motor, the use of position sensorless technology for their control and drive implementation becomes highly valuable. In fact, the cost reduction associated with removing the position sensor can constitute a significant source of profit in high volume production. Furthermore, since a mechanical position sensor can be bulky and prone to failure in harsh environments, replacing it with a sensorless algorithm can increase the reliability of the motor drive.

The sensorless algorithms that have been proposed in the literature can be classified under two distinct categories, namely, those that work only at high speed and those that work only at low speed. As of today, there are no sensorless algorithms that single-handedly permit operation over the entire speed range. This fact restricts the use of sensorless technology in servo systems, such as those employed in robotics and automotive applications.

The high speed sensorless algorithms employed for PM motors are all directly or indirectly based on extracting position information from the motor back-EMF. Since the back-EMF is practically non-existent at low speed, these techniques cannot operate in the low speed range. As a means for extracting position information from the back-EMF, various algorithms have been proposed. For example, state observers, Kalman filters, hypothetical rotor position, and voltage and current measurement, have been successfully used as high speed sensorless approaches.

The low speed sensorless algorithms are all based on the extraction of position information from a stator inductance variation caused by rotor saliency. Therefore, unlike high speed sensorless algorithms, low speed sensorless algorithms are restricted to operation with PM motors that exhibit saliency. Such saliency is often a characteristic of the construction of the motor, as is the case of an IPM (interior permanent magnet) motor. In an IPM motor, the stator inductance variation caused by rotor saliency can be detected even at low or zero speed, by resorting to various kinds of excitation. The detected stator inductance variation can thereafter be used to extract position information. Hence, the low speed sensorless algorithms can be classified as per their method of excitation and detection of the stator inductance variation. For example, methods based on excitation by test pulses and current amplitude measurement, fluctuating vector excitation and high-frequency impedance measurement, fluctuating vector excitation and phase measurement, and rotating vector excitation and current demodulation, have all been successfully employed for estimating position at low and zero speed. Because of necessary assumptions that become invalid at high speed, these low speed sensorless algorithms cannot operate at high speed. Furthermore, they all share a limitation, whereby the polarity (i.e. positive or negative) of the estimated position is unknown and must be determined by other means.

SUMMARY OF THE INVENTION

Responsive to these issues, the present invention relates to a novel algorithm, referred to as a "fusion algorithm," which fuses information resulting from high speed and low speed sensorless algorithms in order to estimate motor position. The fusion of the information is seamless, and the resulting estimated position is valid over the entire speed range. Experimental results show that the position estimation error obtained from this fusion algorithm is smaller, in most of the speed spectrum, than that obtained by either the low speed or the high speed algorithm alone. Furthermore, it is shown that the fusion algorithm resolves the position polarity problem, which characterizes low speed sensorless algorithms.

The present disclosure includes: (A) a motor model that will be used throughout the discussion; (B) the high speed sensorless algorithm employed to estimate position at high speed; (C) the low speed sensorless algorithm employed to estimate position at low and zero speed; (D) the proposed fusion algorithm; (E) experimental results of the entire system, based on the novel fusion algorithm; and (F) conclusions.

Other features and advantages of the present invention will become apparent from the following description of embodiments of the invention which refers to the accompanying drawings.

DETAILED DESCRIPTION OF EMBODIMENTS OF THE INVENTION

A. Mathematical Model of Motor

Figure 1:
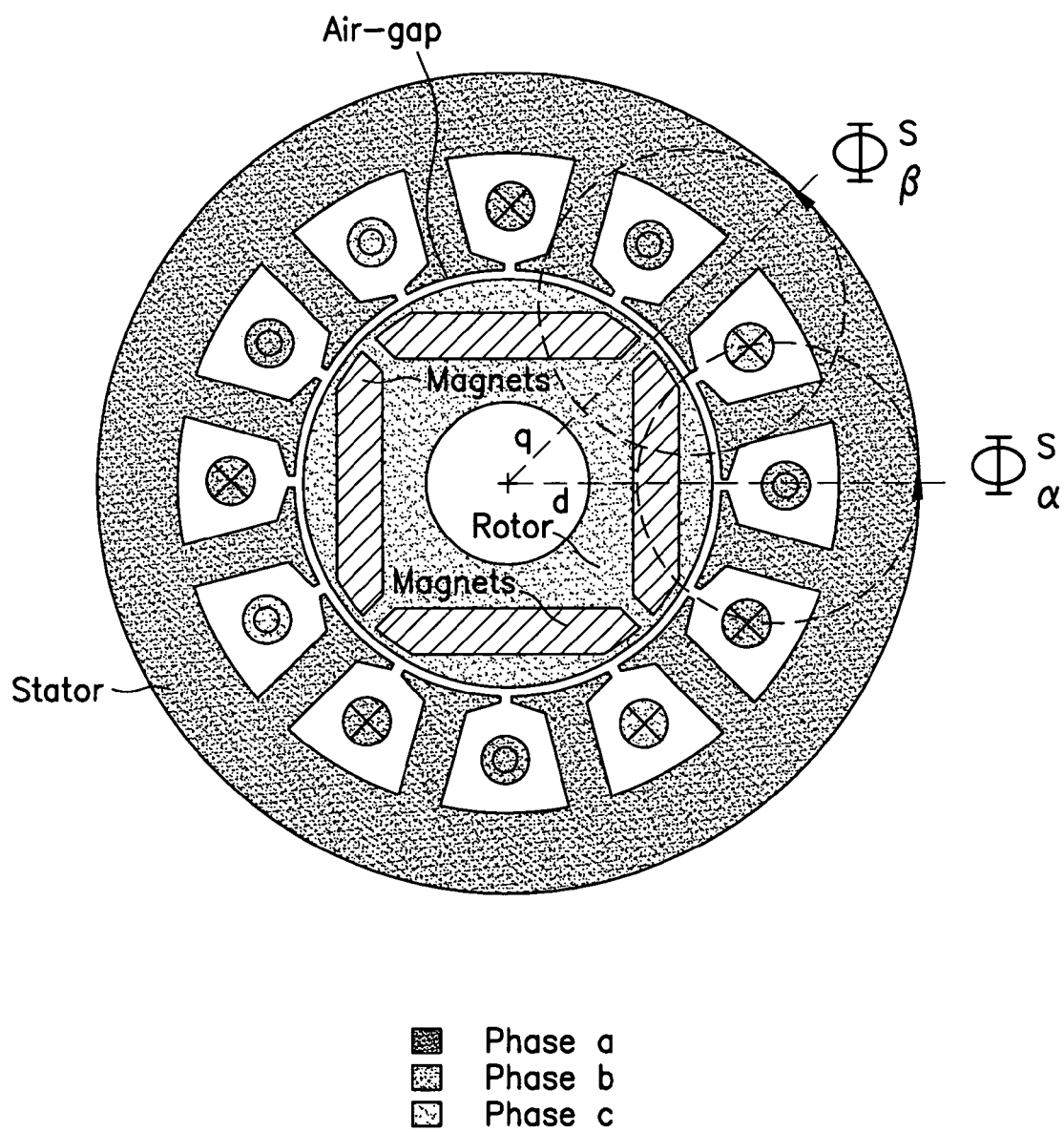
FIG. 1 is a cross-sectional view of a 2-pole IPM motor to be used to illustrate the principles of the invention.

A PM motor constructed with saliency will exhibit a constant difference $\Delta L^r$ between its stator inductance L observed along the d-axis and that observed along the q-axis of the rotating reference frame. In the stationary reference frame, this difference will manifest itself as a variation in L that is a function of the rotor position. This is the case for the IPM motor shown in FIG. 1, which exhibits saliency. For this IPM motor, it is evident that the flux $\Phi_\alpha{}^s$ sees less reluctance than $\Phi_\beta{}^s$ because it flows mostly along the length of the low reluctance magnet material. The inductance $L_\alpha$ will therefore differ from $L_\beta$.

This inductance variation appears in the differential equations that govern the electrical dynamics of the motor. These are given by (1) and (2), in the rotating reference frame.

$$V_d^r = R i_d^r + L \frac{d}{dt} i_d^r - L \omega_m i_q^r \tag{1}$$

$$V_q^r = R i_q^r + L \frac{d}{dt} i_q^r - \Delta L^r \frac{d}{dt} i_q^r + L \omega_m i_d^r + \lambda^r \omega_m \tag{2}$$

Where:
- $V_d^r$ and $V_q^r$ are the direct and quadrature voltages.
- $i_d^r$ and $i_q^r$ are the direct and quadrature currents.
- $\omega_m$ is the mechanical velocity of the rotor.
- $\lambda^r$ is the equivalent magnet flux.
- L is the average stator winding inductance.
- R is the stator resistance.
- $\Delta L^r$ is the constant difference between the d-axis and q-axis inductances, due to saliency.

In equation (2), $\Delta L^r$ becomes zero in the case where the motor does not exhibit saliency.

Equations (1) and (2) can be transformed into the stationary reference frame. This yields equations (3) and (4).

$$V_\alpha^s = R i_\alpha^s + L \frac{d}{dt} i_\alpha^s + \Delta L^r \sin(2\theta_e) \frac{d}{dt} i_\beta^s - L \omega_m i_\beta^s - \lambda^r \omega_m \sin(\theta_e) \tag{3}$$

$$V_\beta^s = R i_\beta^s + L \frac{d}{dt} i_\beta^s - \Delta L^r \cos(2\theta_e) \frac{d}{dt} i_\beta^r + L \omega_m i_\alpha^r + \lambda^r \omega_m \sin(\theta_e) \tag{4}$$

Where $\theta_e$ is the rotor electrical position.

From (3) and (4), it is apparent that the inductance variation $\Delta L^r$ becomes a sinusoidal function of the rotor position, in the stationary reference frame. Thus, it is the job of a low speed sensorless algorithm to extract this position information. Similarly, it is apparent that the motor back-EMF $\lambda^r \omega_m$ also becomes a sinusoidal function of the rotor position in the stationary reference frame. Since the back-EMF is plentiful at high speed, it is the job of a high speed sensorless algorithm to extract this embedded position information.

The stator currents, flowing in quadrature with respect to the magnet flux, will produce a torque given by equation (5).

$$T_m = P \lambda^r i_q^r \tag{5}$$

Where $T_m$ is the motor torque, and P is the number of pole pairs constructed in the motor. The torque will cause the rotor to turn, as governed by the differential equation given by (6).

$$J \frac{d}{dt} \omega_m = T_m - \beta \omega_m - T_L \tag{6}$$

Where:
- J is the moment of inertia of the rotor assembly.
- $\beta$ is the damping coefficient between the rotor and the stator.
- $T_L$ is the load or disturbance torque.

B. The High Speed Sensorless Algorithm

Figure 2:
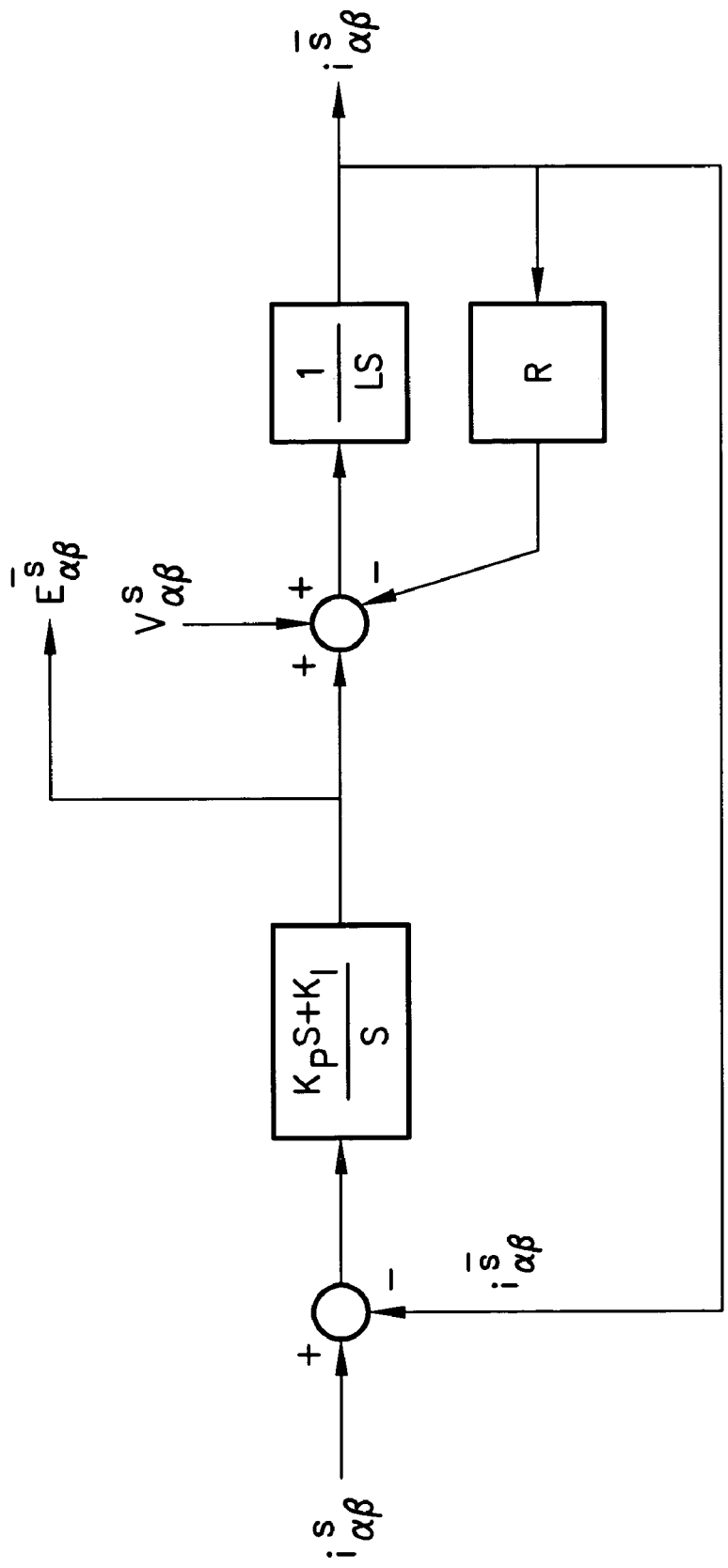
FIG. 2 is a block diagram showing a back-EMF observer forming part of a high speed sensorless algorithm.

It is seen from equations (3) and (4), that absolute rotor position information is imbedded in the motor back-EMF terms. As such, the first stage of the high speed sensorless algorithm is a back-EMF observer. Ignoring the inductance variation due to rotor saliency and the cross coupling terms of (3) and (4), the differential equations that govern such observer are given by (7) and (8). A block diagram of a back-EMF observer is additionally shown in FIG. 2.

$$L \frac{d}{dt} \overline{i_\alpha^s} = V_\alpha^s - R \overline{i_\alpha^s} + \frac{K_P s + K_I}{s} (i_\alpha^s - \overline{i_\alpha^s}) \tag{7}$$

$$L \frac{d}{dt} \overline{i_\beta^s} = V_\beta^s - R \overline{i_\beta^s} - \frac{K_P s + K_I}{s} (i_\beta^s - \overline{i_\beta^s}) \tag{8}$$

Where:
- $\overline{i_\alpha^s}$ is the estimated motor α-axis current.
- $\overline{i_\beta^s}$ is the estimated motor β-axis current.
- $K_P$ is a proportional constant.
- $K_I$ is an integral constant.

The outputs of the back-EMF observer are the estimated back-EMF terms expressed by equation (9).

$$\overline{E_{\alpha\beta}^s} \approx \begin{bmatrix} \lambda^r \omega_m \sin(\theta_e) \\ -\lambda^r \omega_m \cos(\theta_e) \end{bmatrix} \tag{9}$$

Given these estimated back-EMF terms, the rotor position can be calculated, using the arctan function, as demonstrated in equation (10).

$$\overline{\theta_e} = \arctan \left[ \frac{\lambda^r \omega_m \sin(\theta_e)}{\lambda^r \omega_m \cos(\theta_e)} \right] \tag{10}$$

Figure 3:
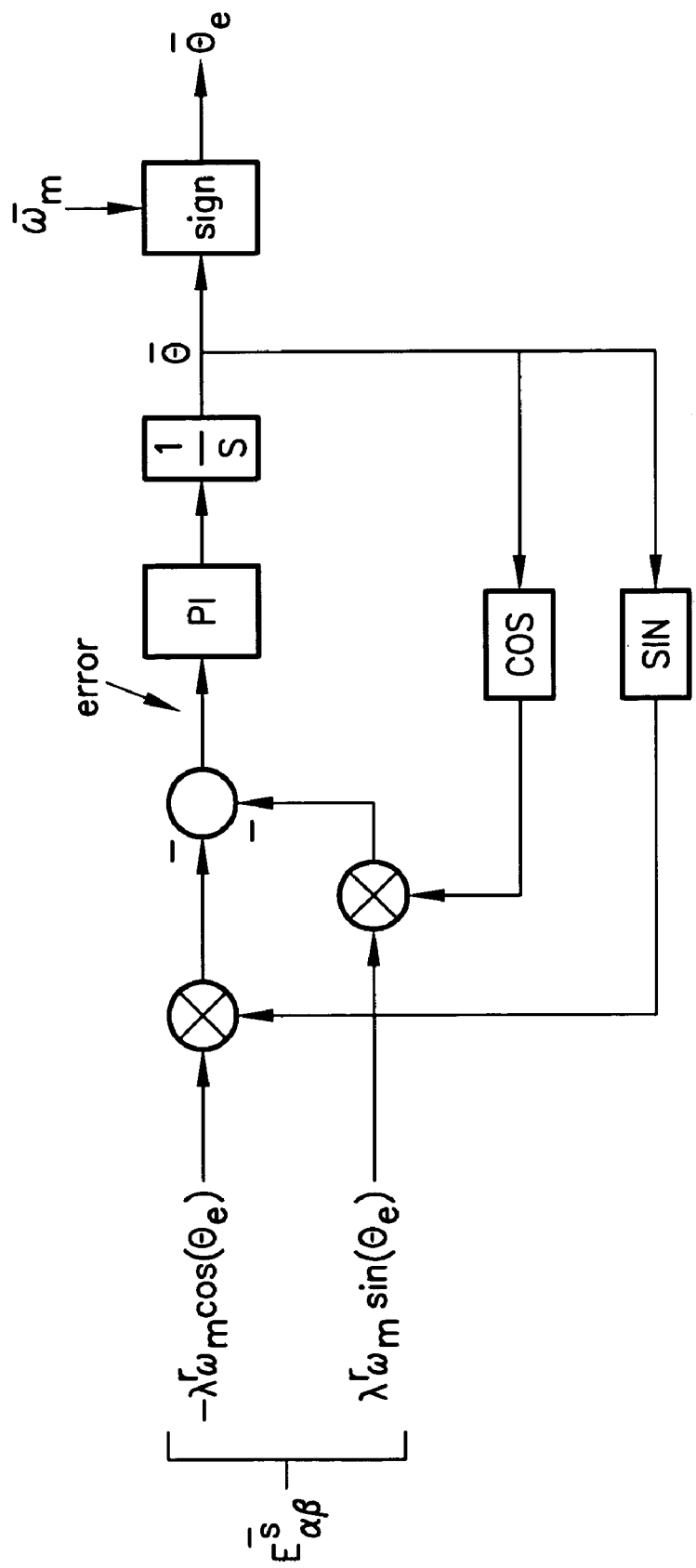
FIG. 3 is a block diagram showing a phase locked-loop for use in the high speed sensorless algorithm and other aspects of the invention.

Since the arctan function can be computationally intensive, it is more practical, from an implementation perspective, to extract the rotor position information using a phase locked-loop (PLL). The block diagram of such PLL is shown in FIG. 3. The PLL takes the estimated back-EMF terms as an input, and extracts the rotor position. The "sign" block multiplies $\overline{\theta}$ by the sign of $\overline{\omega}_m$. The PLL yields an estimate of the absolute rotor electrical position, which is valid at high speed.

At low and zero speed, the motor back-EMF becomes non-existent and the PLL output (i.e. the estimated rotor position) becomes invalid. This problem is common amongst all sensorless algorithms that are based on extracting position information from the motor back-EMF.

C. The Low Speed Sensorless Algorithm

At low and zero speed, the motor back-EMF is non-existent. As such, it is not possible to extract position information from the back-EMF terms, as described above in section (B). Instead, we utilize the inductance variation caused by rotor saliency, which also embeds absolute rotor position information. As seen in equations (3) and (4), the amplitude of this inductance variation is a function of the derivative of motor currents. As a means to amplify these derivatives, and thus make the inductance variation terms observable, the motor is excited with a high frequency voltage. The excitation voltage is injected into the stator as demonstrated in FIG. 4.

Figure 4:
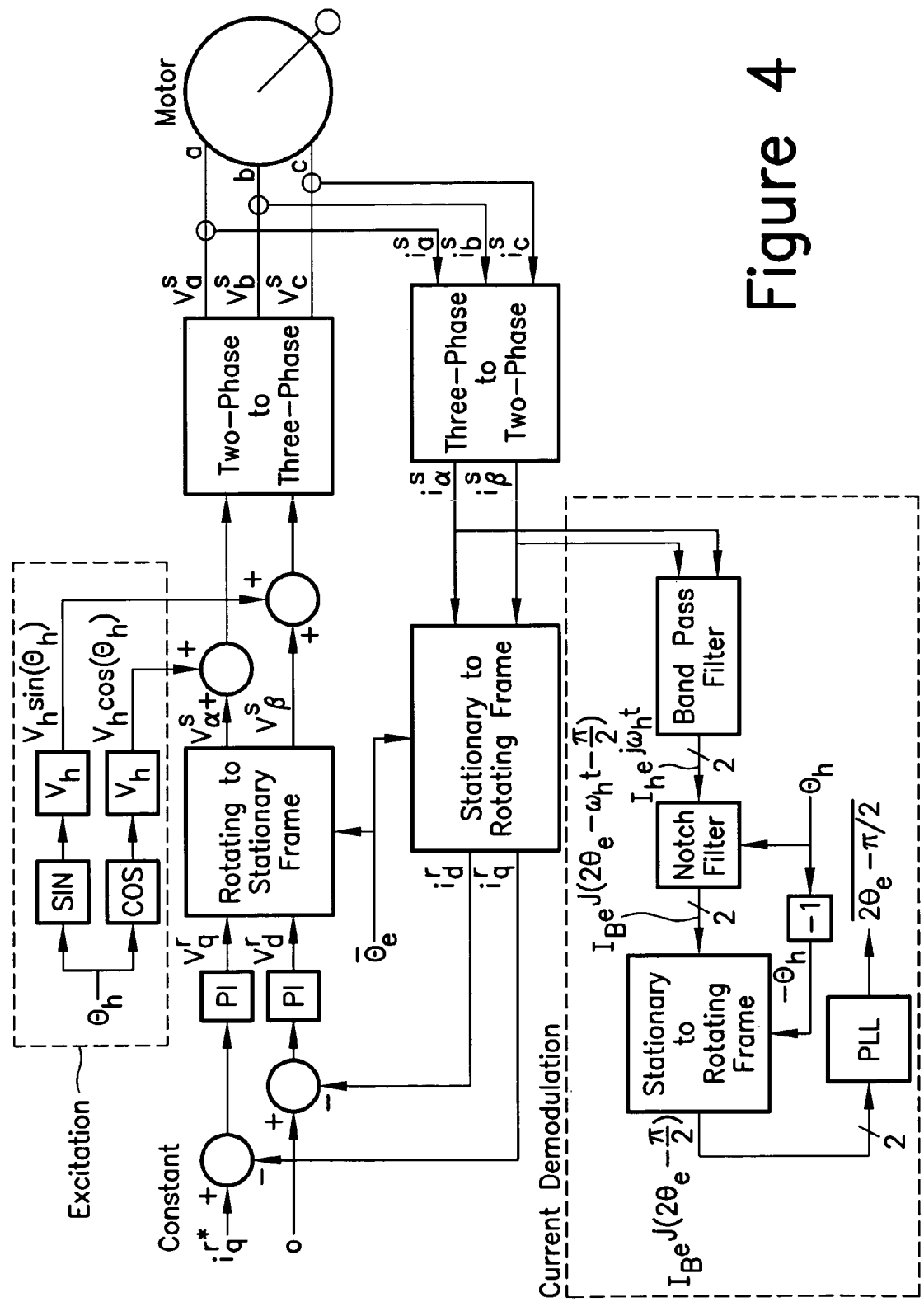
FIG. 4 a block diagram showing a low speed sensorless algorithm.

The current feedback, resulting from this excitation, is sampled and the samples are digitally processed, using the demodulation algorithm depicted in FIG. 4. At low speed, the current feedback can be represented by the phasor diagram of FIG. 5.

Thus, the current is composed of three components. The first component, $Ie^{j\omega_a t}$, is the torque-producing current that rotates at the rotor velocity. The second component, $I_F e^{j\omega_h t}$, rotates in the forward direction (i.e. counterclockwise) at the excitation frequency. The third component, $$I_B e^{j(2\theta_r - \omega_h t - \frac{\pi}{2})},$$

rotates backwards (i.e. clockwise), at the excitation frequency. This third component, however, embeds rotor position information in its phase. The purpose of the demodulation algorithm is thus to extract this position information.

The demodulation algorithm is composed of four stages, as shown in FIG. 4. The first stage is a band-pass filter, which removes the torque producing current. The second stage is a notch filter, which removes the forward rotating current component. The third stage is a reference frame transformation, which transforms the remaining backward component into a reference frame that rotates in synchronism with the negative of the excitation frequency. This has for effect to remove the dependency of the backward rotating component, on $-\omega_h t$. The output of this third stage is a simple vector that rotates as a function of the rotor absolute position. As a fourth and final stage, this rotor absolute position is extracted using a phase-locked loop.

In FIG. 4, the Current Command represents a preferred amount of current to be developed in the motor. Usually, a motor is driven by a control system. The control system can be a position controller, a speed controller, or a current controller. This embodiment of the invention uses a current controller. The job of the current controller is to drive the motor in such a manner that the amount of current developed in the stator equals the commanded current (i.e. the amount indicated by the current command). In other words, the current controller causes the motor current to continuously track the current command. In the case of a speed controller, the motor would be driven such that the motor speed tracks a speed command. This principle would also apply to position controllers.

Figure 5:
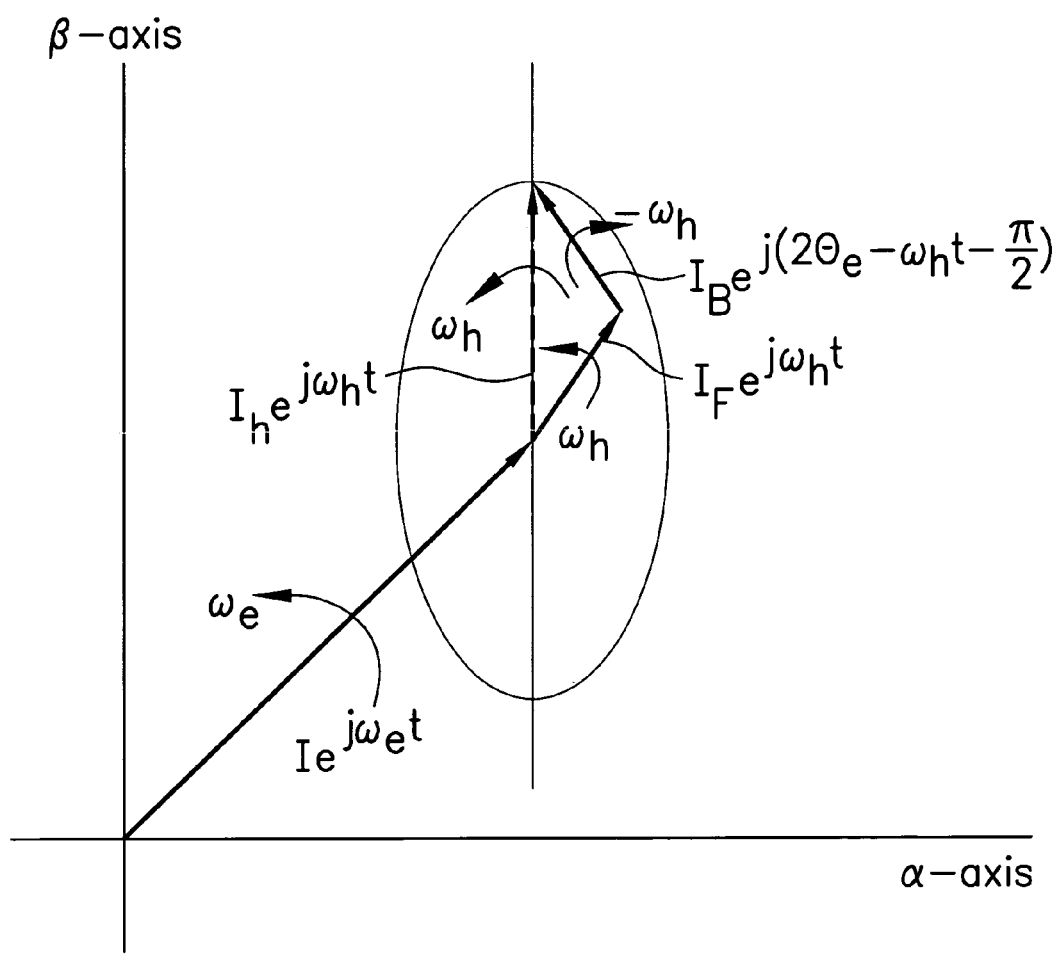
FIG. 5 is a phasor diagram representation of current feedback in the low speed sensorless algorithm.

Note that at high speed, the phasor diagram of FIG. 5 becomes distorted. This is due to the presence of back-EMF, which was ignored in deriving FIG. 5. As such, at high speed, it is no longer simple to extract the position embedded in the backward rotating current component. This low speed sensorless algorithm therefore fails at high speed.

At low speed, the estimated position generated by this sensorless algorithm exhibits a position polarity problem. This is due to the fact that the extracted position is that of the magnet poles. Since there are two poles (i.e. magnetic North and South) per rotor electrical revolution, the extracted position becomes a function of twice the rotor position and the true rotor polarity is lost. It will be shown, in section (D), that the proposed fusion algorithm is able to resolve this position polarity problem.

D. The Proposed Fusion Algorithm

Figure 6:
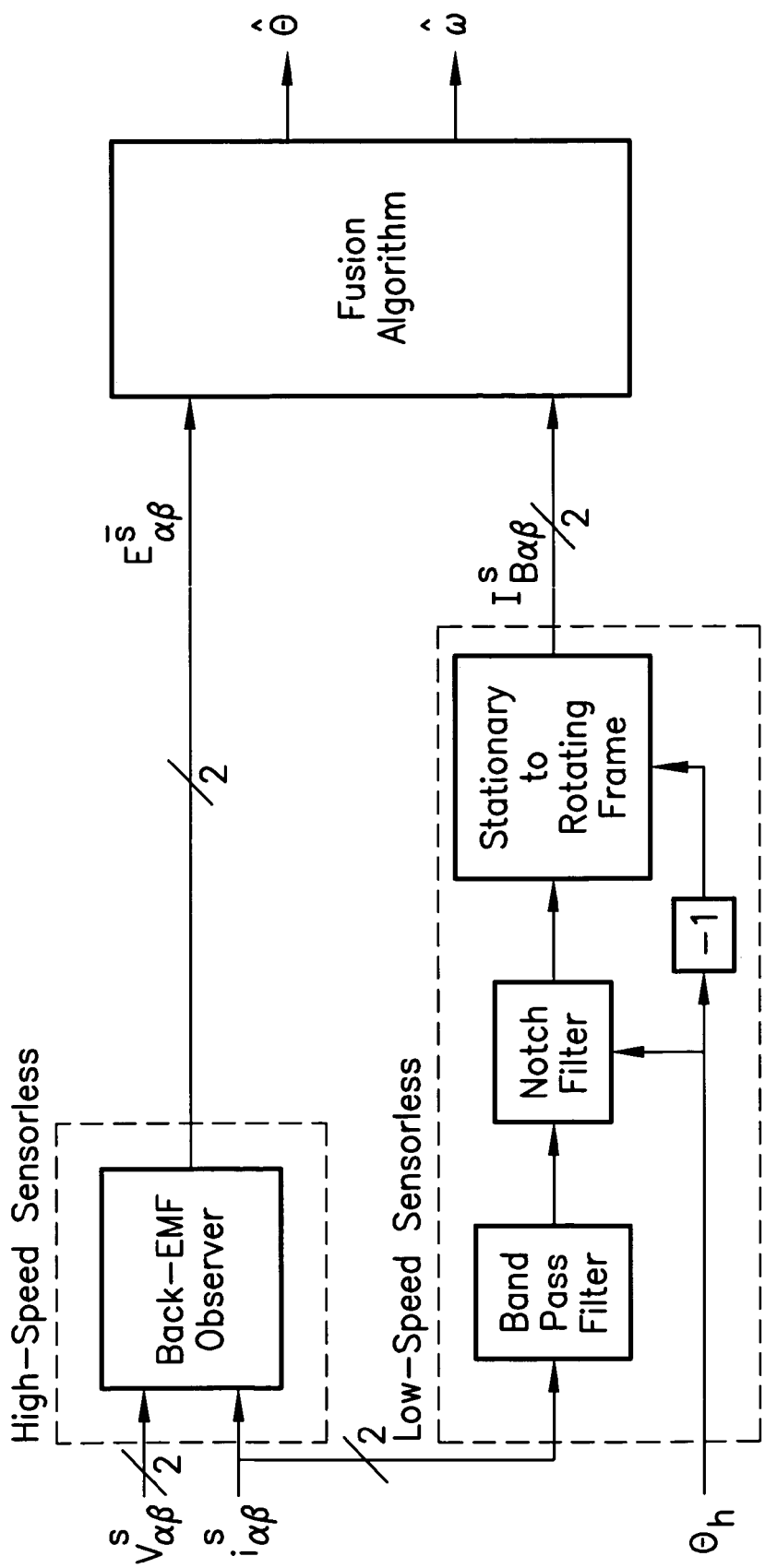
FIG. 6 is a high level block diagram showing a fusion algorithm.

Since the high speed sensorless algorithm fails at low speed, and the low speed sensorless algorithm fails at high speed, a novel fusion algorithm is proposed to enable sensorless operation over the entire speed range. The proposed algorithm fuses information originating from the low and high speed sensorless algorithms. The sensorless algorithms are both employed by the fusion algorithm, as demonstrated in FIG. 6. The "Fusion Algorithm" block in FIG. 6 incorporates the PLL for the high speed algorithm shown in FIG. 3. It also incorporates the PLL for the low speed algorithm shown in FIG. 4 which, in this embodiment, may be identical to the PLL shown in FIG. 3. In FIG. 6, the signal $I_{B\alpha\beta}{}^s$ represents the signal $$I_B e^{j(2\theta - \frac{\pi}{2})}$$

expressed by its rectangular components instead of by the complex exponential.

The fusion algorithm, expressed by the block diagram of FIG. 8, generates an error signal $e(\overline{\theta}_e)$ according to equation (11), below, which is used as an input to a proportional integral (PI) controller. The error signal causes the output of the PI controller to converge to the actual rotor position. In accordance with the main objective of the fusion algorithm, the error signal is seamlessly available over the entire speed range, enabling sensorless operation at any speed. The proposed error signal is given by equation (11). It is additionally plotted, in FIG. 7, as a function of the estimated position and for the case where the actual rotor position is fixed at $\pi/4$.

$$e(\overline{\theta}_e) = -I_{B\alpha}{}^s \cos(2\overline{\theta}_e) - I_{B\beta}{}^s \sin(2\overline{\theta}_e) - \text{sign}(\overline{\omega})[\overline{E}_\beta{}^s \sin(\overline{\theta}_e) + \overline{E}_\alpha{}^s \cos(\overline{\theta}_e)] \quad (11)$$

Figure 7:
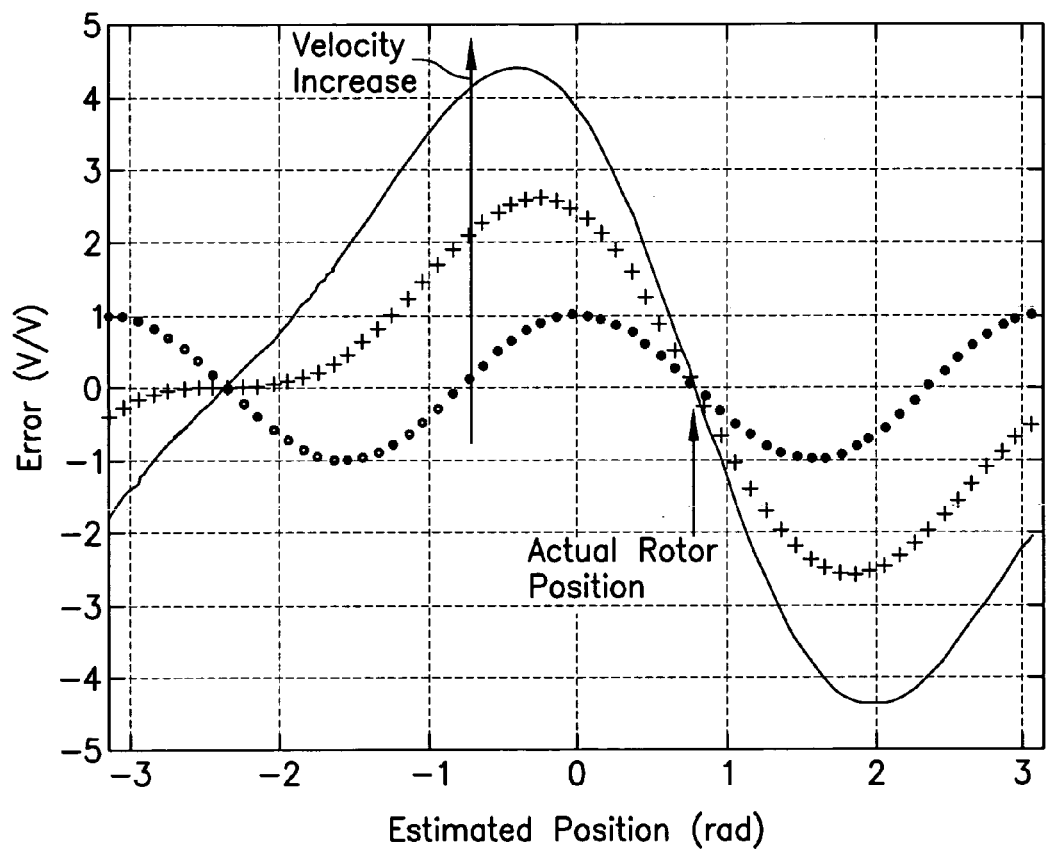
FIG. 7 is a graph showing a fusion error signal.
Figure 8:
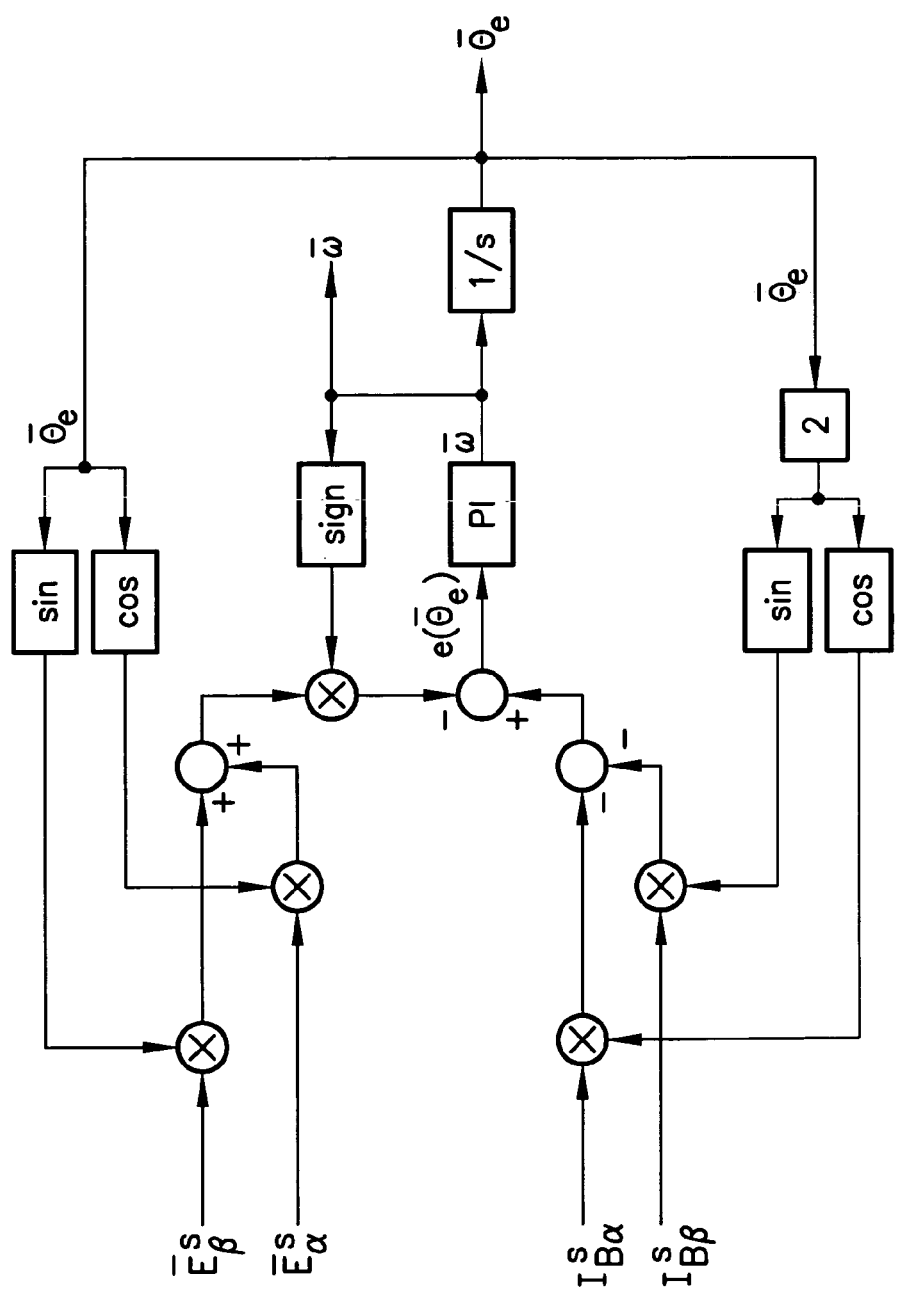
FIG. 8 is a block diagram of the fusion algorithm.

In FIG. 7, the dotted line represents the error signal for the case where the velocity is zero. As the velocity increases, the error signal shape changes into the plus line and into the solid line. As it can be seen, the convergence point (i.e. $\pi/4$) remains valid at any speed. Furthermore, it is evident from FIG. 7, that there are two convergence points at zero speed. This is in accordance with the position polarity problem that characterizes low speed sensorless algorithms. However, as the velocity increases, the incorrect convergence point (i.e. $-3\pi/4$) disappears. This is the mechanism with which the fusion algorithm is able to resolve the position polarity problem. Given the error signal of equation (11), the fusion algorithm can be expressed by the block diagram of FIG. 8. As described above, the fusion algorithm incorporates respective PLL's for the high and low speed algorithms, both being based on the basic PLL circuit shown in FIG. 3.

As the velocity increases, the fusion algorithm allows the suppression of the excitation signal that is required by the low speed sensorless algorithm. In fact, this excitation signal creates audible noise that is extremely unwanted in certain applications, such as automotive systems. As the velocity increases, the fusion algorithm relies more on the motor back-EMF, to extract the rotor position, and less on the low speed sensorless algorithm. Since the low speed sensorless algorithm is less needed, as the speed increases, its excitation can be dimmed down in order to reduce audible noise. In the research work on this invention, the motor excitation was controlled as a function of the derivative of the error signal, evaluated at the point where the estimated position equals the actual position. That is, the excitation amplitude $v_h$ was controlled by equation (12).

$$V_h = \max\left\{0, \left.V_{h\max} + K_{scale}\frac{d}{d\overline{\theta}_e}e(\overline{\theta}_e)\right|_{\overline{\theta}_e=\theta_e}\right\} \quad (12)$$

Equation (12) is designed to control the excitation amplitude such as to keep the error derivative negative and permit stable convergence of the fusion algorithm.

Figure 8A:
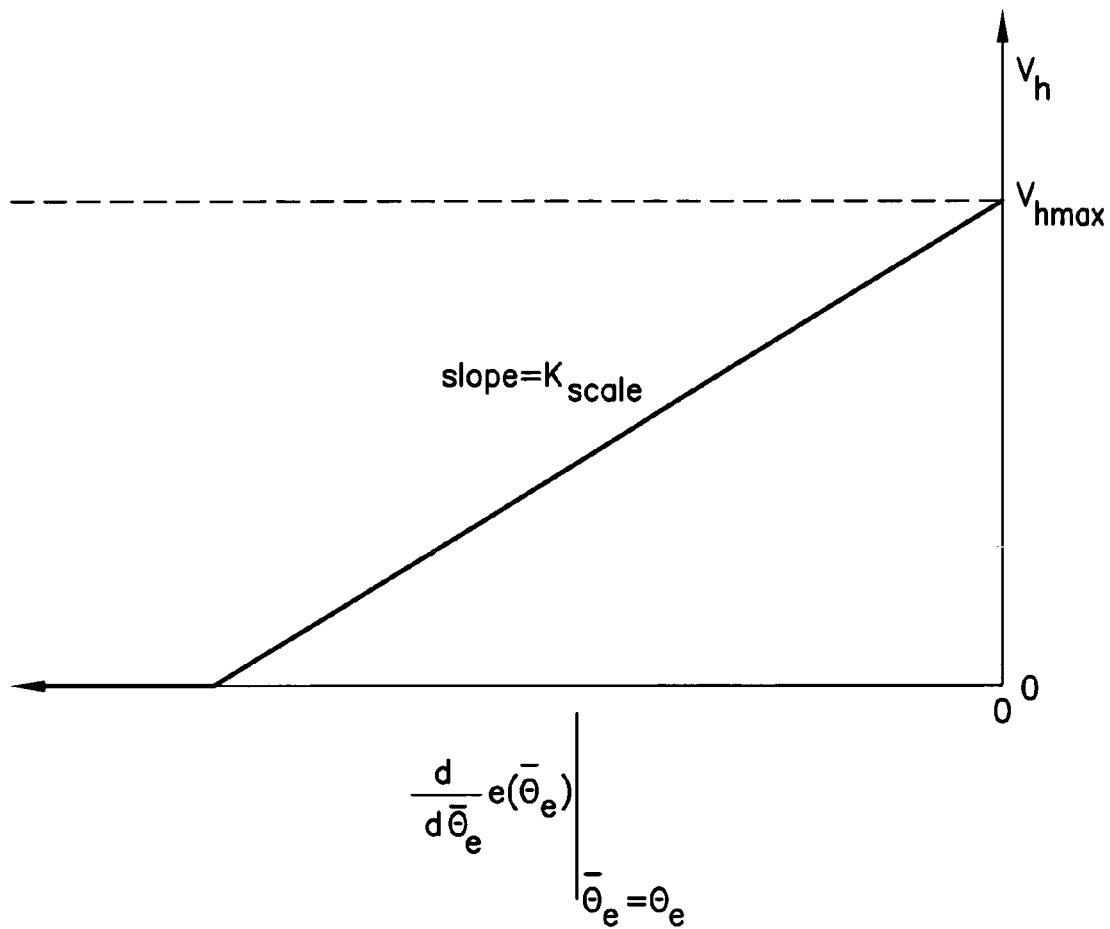
FIG. 8A is a graph representative of excitation amplitude.

As the motor velocity increases, and thereby the motor back-EMF becomes plentiful, the derivative term of equation (12) becomes more negative. This causes the excitation amplitude Vh to decrease (i.e. at higher speed, there is no longer a need for excitation). The excitation amplitude is restricted to a minimum of 0 and a maximum of Vhmax. If the motor velocity decreases, the derivative term of equation (12) becomes less negative. In such case, the excitation amplitude increases. FIG. 8A represents this behavior.

E. Experimental Results

Figure 9:
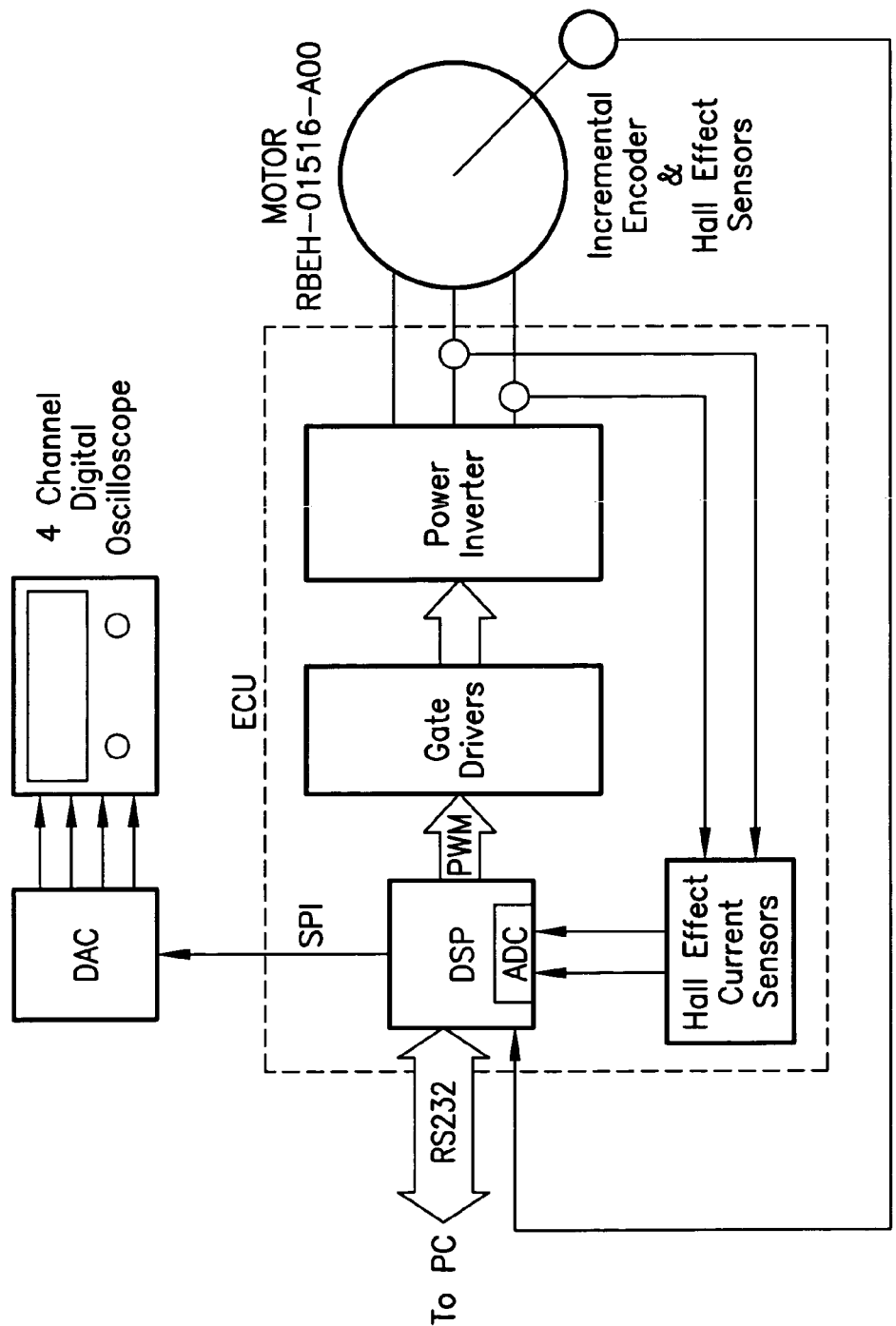
FIG. 9 is a block diagram showing an experimental setup.

FIG. 9 depicts the experimental setup that was used to obtain the results presented in this section. Elements of the electronic control unit (ECU) are conventional except for the novel DSP which carries out the fusion algorithm described herein. The RBEH motor series is manufactured by Kollmorgen.

Figure 10:
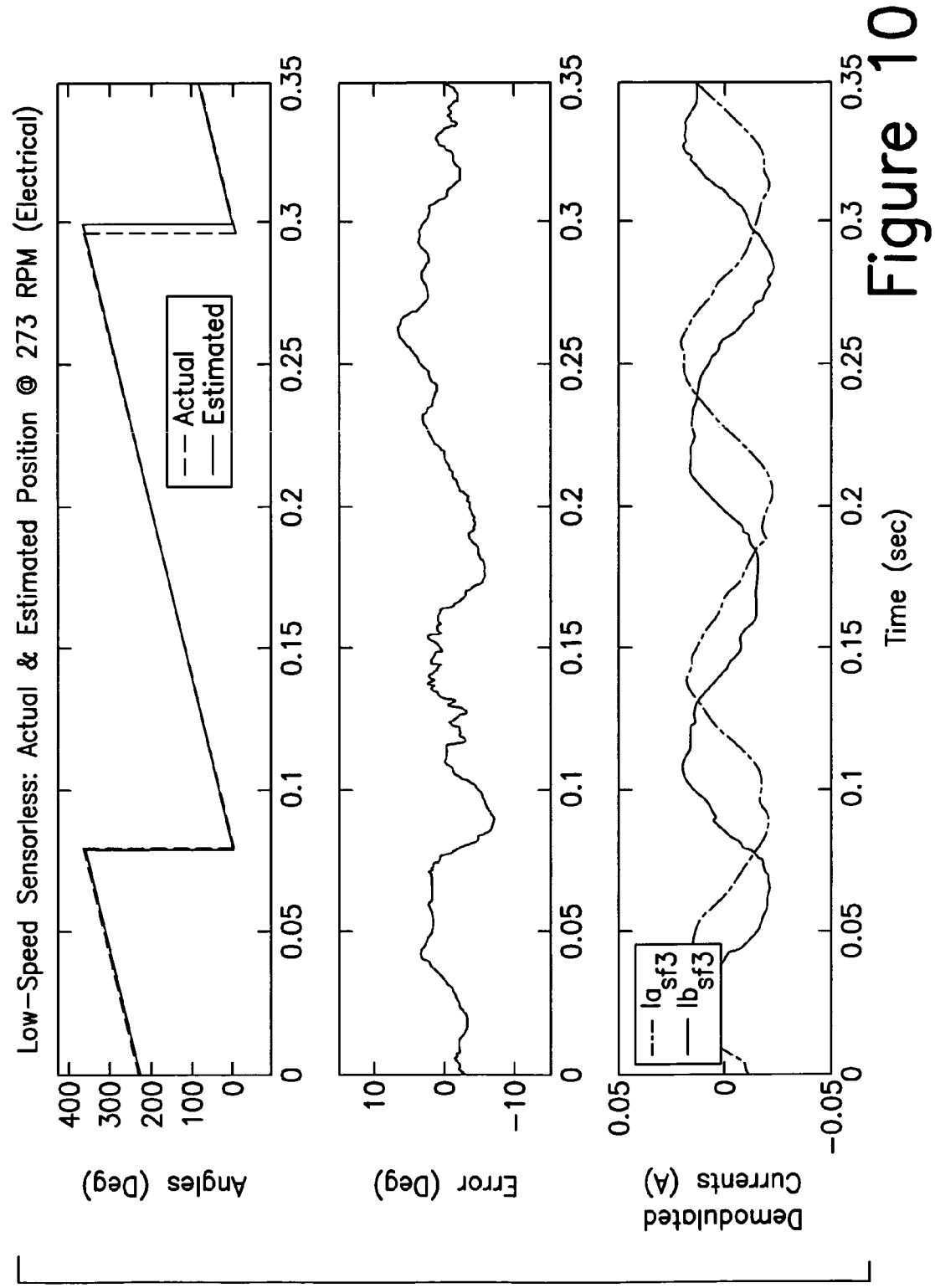
FIG. 10 is a graph showing estimated and actual positions and values at 273 RPM.
Figure 11:
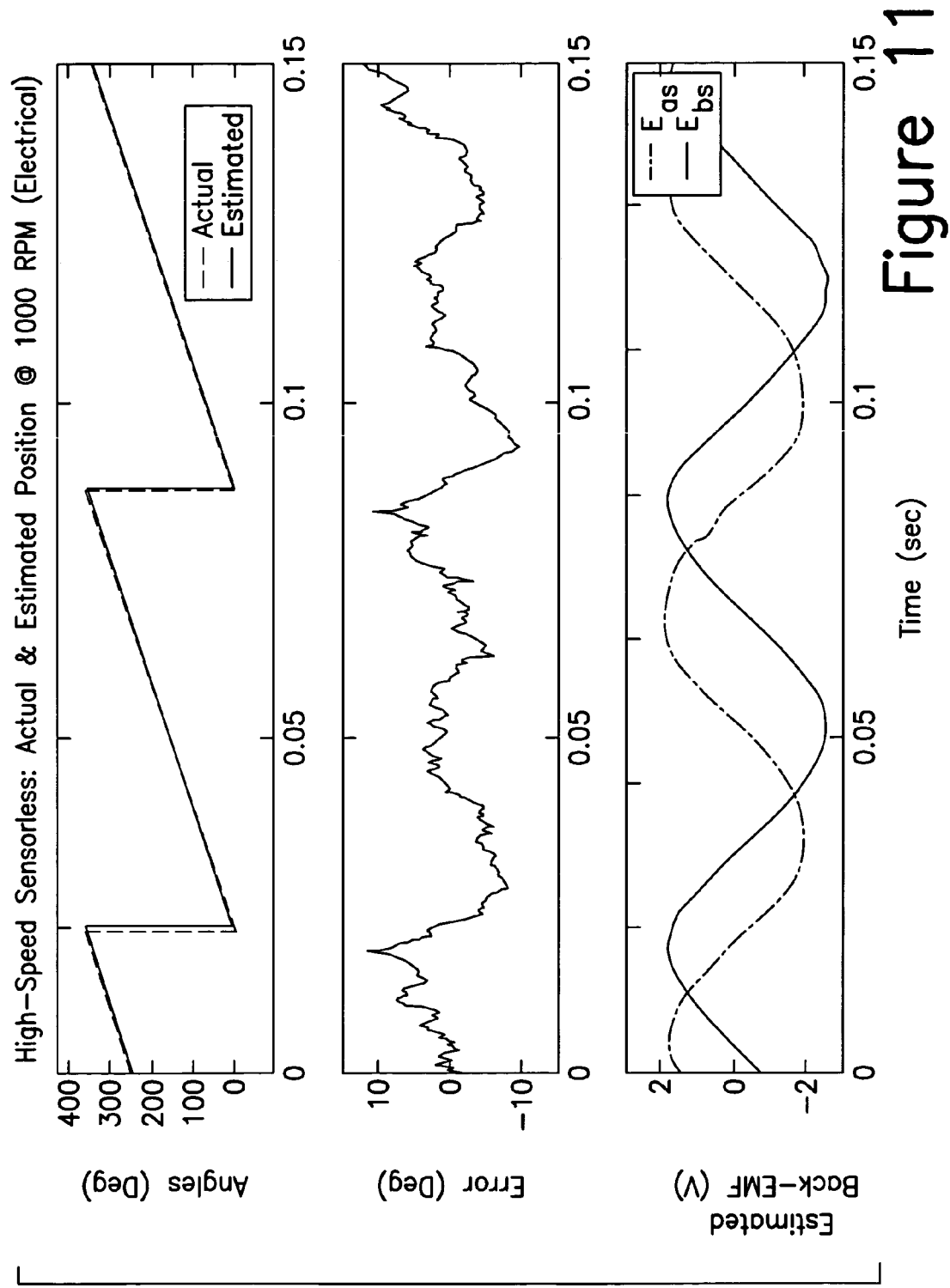
FIG. 11 is a graph showing estimated and actual positions and values at 1000 RPM.

FIG. 10 and FIG. 11 show the estimated and actual rotor positions recorded at low and high speed respectively. The estimated position is generated by the fusion algorithm. As one can see from these figures, the estimation error remains minimal.

Figure 12:
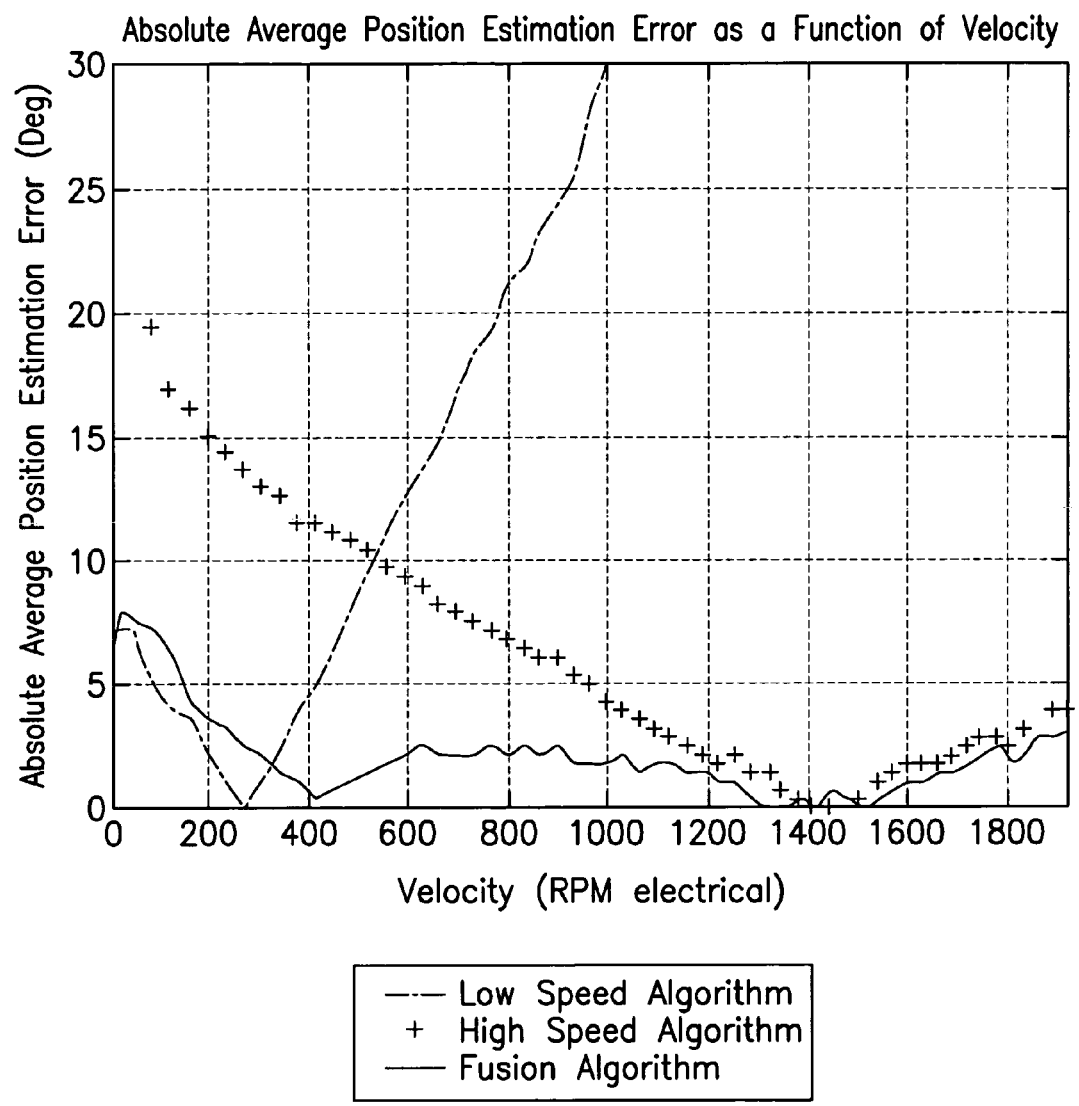
FIG. 12 is a graph showing estimation error as a function of velocity.

FIG. 12 shows the estimation error as a function of the rotor velocity, obtained by using the fusion algorithm, as well as by using stand-alone low speed and high speed sensorless algorithms.

It can be seen from FIG. 12 that the fusion algorithm provides less estimation error than either of the stand-alone low or high speed sensorless algorithms. That is true for most of the speed range. Therefore, from a performance perspective, it is more advantageous to use the fusion algorithm than to use a low speed sensorless algorithm and then abruptly switch over to a high speed sensorless algorithm upon reaching some speed threshold.

Figure 13:
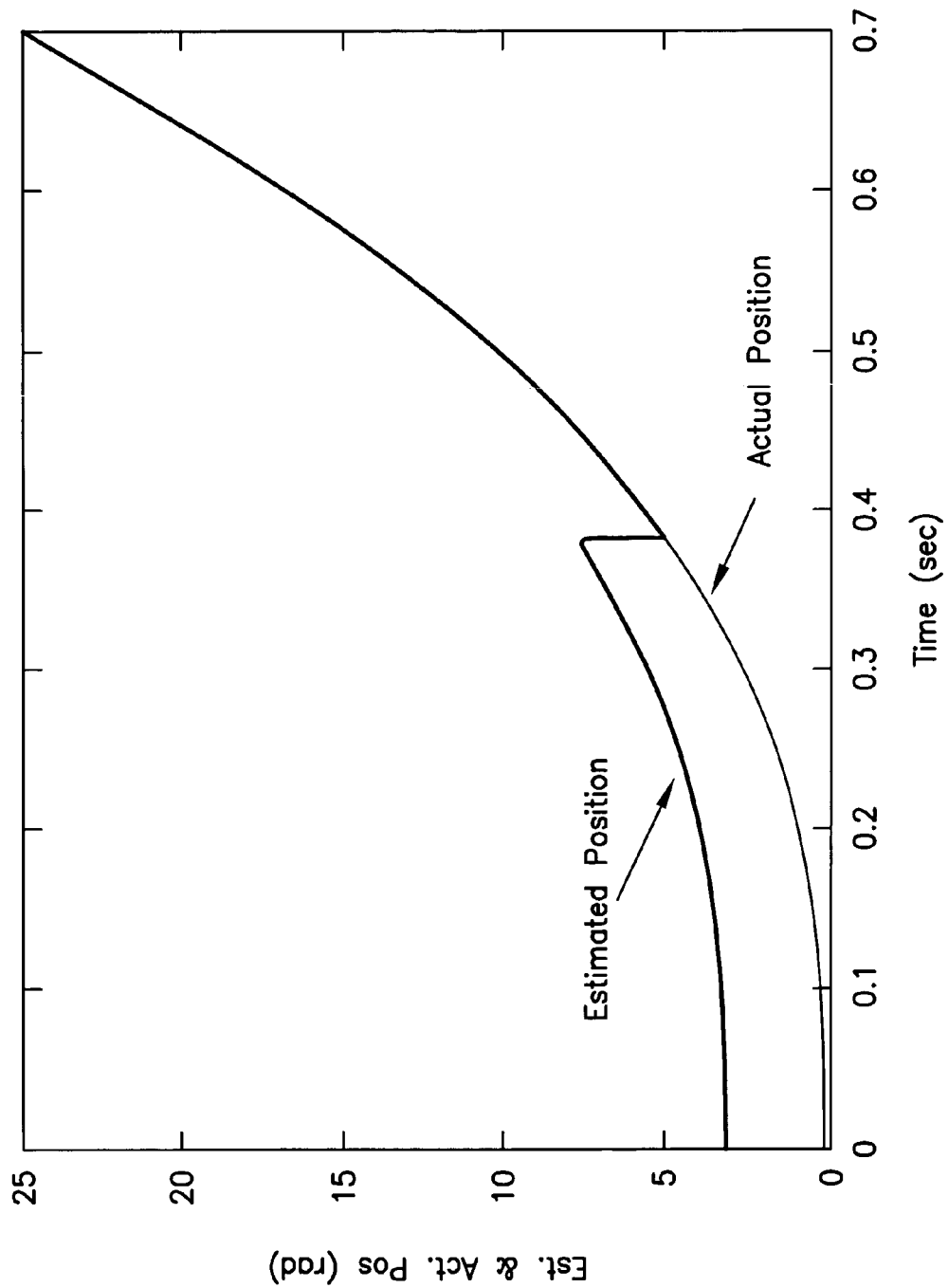
FIG. 13 is a graph showing an example of position polarity resolution.

Finally, FIG. 13 shows an example of the position polarity resolution.

F. Conclusion

As explained herein, the novel fusion algorithm achieves sensorless operation over a wide speed range. The following conclusions can be drawn.

- The fusion algorithm permits effective sensorless operation over the entire speed range of the motor tested, zero to approximately 2000 r.p.m., and should likewise be effective over the entire speed range of any PM motor.
- The fusion algorithm exhibits less estimation error than either of the stand-alone low and high speed sensorless algorithms.
- The fusion algorithm resolves the position polarity problem, as the motor speed increases.
- Using the fusion algorithm, the motor excitation can be dimmed-down as the speed increases, in order to reduce audible noise.

Although the present invention has been described in relation to particular embodiments thereof, many other variations and modifications and other uses will become apparent to those skilled in the art. Therefore, the present invention is not limited by the specific disclosure herein.

What is claimed is:

1. A position sensorless drive for PM synchronous motors, comprising:
    drive circuits operable for driving a PM synchronous motor; and
    a control module which receives voltage and current information from said PM synchronous motor, determines a rotor position of said PM motor, and generates control signals which control said drive circuits on the basis of said rotor position at zero, low and high motor speeds,
    wherein for relatively low speeds, said control module derives said rotor position on the basis of rotor inductance variations, and
    wherein said inductance variations are determined according to:

$$V_d^r = Ri_d^r + L\frac{d}{dt}i_d^r - L\omega_m i_q^r \quad (1)$$

$$V_q^r = Ri_q^r + L\frac{d}{dt}i_q^r - \Delta L^r\frac{d}{dt}i_q^r + L\omega_m i_d^r + \lambda^r\omega_m \quad (2)$$

Where:
  $V_d^r$ and $V_q^r$ are the direct and quadrature voltages,
  $i_d^r$ and $i_q^r$ are the direct and quadrature currents,
  $\omega_m$ is the mechanical velocity of the rotor,
  $\lambda^r$ is the equivalent magnet flux,
  L is the average stator winding inductance,
  R is the stator resistance,
  $\Delta L^r$ is the constant difference between the d-axis and q-axis inductances, due to saliency.

2. The drive of claim 1, wherein said control module further controls injection of a high frequency excitation voltage into the stator of the motor for amplifying said inductance variations.

3. The drive of claim 2, wherein said excitation voltage is reduced as motor speed increases.

4. The drive of claim 3, wherein said excitation voltage is controlled according to:

$$V_h = \max\left\{0, \left.V_{h\max} + K_{scale}\frac{d}{d\overline{\theta}_e}e(\overline{\theta}_e)\right|_{\overline{\theta}_e=\theta_e}\right\} \quad (12)$$

5. The drive of claim 2, wherein a current feedback due to said excitation voltage is demodulated by a demodulation module.

6. The drive of claim 5, wherein said demodulation module comprises a filter, a reference frame transformation, and a PLL.

7. The drive of claim 1, wherein at zero and low speeds said control module determines the polarity of said rotor position.

8. The drive of claim 1, wherein for relatively high motor speeds the control module derives said rotor position on the basis of back-EMF.

9. A position sensorless drive for PM synchronous motors, comprising:
    drive circuits operable for driving a PM synchronous motor; and
    a control module which receives voltage and current information from said PM synchronous motor, determines a rotor position of said PM motor, and generates control signals which control said drive circuits on the basis of said rotor position at zero, low and high motor speeds, wherein for relatively high motor speeds the control module derives said rotor position on the basis of back-EMF, comprising a back-EMF observer module, wherein estimated back-EMF values are expressed by:

$$\overline{E_{\alpha\beta}^s} \approx \begin{bmatrix} \lambda^r \omega_m \sin(\theta_e) \\ -\lambda^r \omega_m \cos(\theta_e) \end{bmatrix}. \tag{9}$$

10. The drive of claim 9, wherein said rotor position is expressed by:

$$\overline{\theta}_e = \arctan\left[\frac{\lambda^r \omega_m \sin(\theta_e)}{\lambda^r \omega_m \cos(\theta_e)}\right]. \tag{10}$$

11. A position sensorless drive for PM synchronous motors, comprising:

drive circuits operable for driving a PM synchronous motor; and a control module which receives voltage and current information from said PM synchronous motor, determines a rotor position of said PM motor, and generates control signals which control said drive circuits on the basis of said rotor position at zero, low and high motor speeds, wherein for relatively high motor speeds the control module derives said rotor position on the basis of back-EMF, comprising a back-EMF observer module, wherein a PLL extracts rotor position from the output of said back-EMF observer module.

12. A position sensorless drive for PM synchronous motors, comprising:

drive circuits operable for driving a PM synchronous motor; and a control module which receives voltage and current information from said PM synchronous motor, determines a rotor position of said PM motor, and generates control signals which control said drive circuits on the basis of said rotor position at zero, low and high motor speeds, wherein said control module comprises a first module which extracts and processes inductance variations and supplies position information at relatively low or zero speeds; and a second module which extracts and processes back-EMF variations and supplies position information at relatively high speeds, wherein said rotor position is related to said inductance and back-EMF variations as follows:

$$V_\alpha^s = Ri_\alpha^s + L\frac{d}{dt}i_\alpha^s + \Delta L^r \sin(2\theta_e)\frac{d}{dt}i_\alpha^s - L\omega_m i_\beta^s - \lambda^r \omega_m \sin(\theta_e) \tag{3}$$

$$V_\beta^s = Ri_\beta^s + L\frac{d}{dt}i_\beta^s - \Delta L^r \cos(2\theta_e)\frac{d}{dt}i_\beta^s + L\omega_m i_\alpha^s + \lambda^r \omega_m \cos(\theta_e) \tag{4}$$

wherein $\theta_e$ is the rotor electrical position.

13. A position sensorless drive for PM synchronous motors, comprising:

drive circuits operable for driving a PM synchronous motor; and a control module which receives voltage and current information from said PM synchronous motor, determines a rotor position of said PM motor, and generates control signals which control said drive circuits on the basis of said rotor position at zero, low and high motor speeds, wherein said control module comprises a first module which extracts and processes inductance variations and supplies position information at relatively low or zero speeds;

a second module which extracts and processes back-EMF variations and supplies position information at relatively high speeds, and a combining module which combines position data output by said first and second modules at all of said zero, low and high speeds and delivers position data for all of said zero, low and high speeds.

14. The drive of claim 13, wherein said combining module comprises respective PLL's for said first and second modules.

15. A method of providing position sensorless drive for PM synchronous motors, comprising the steps of:

providing drive circuits operable for driving a PM synchronous motor; and controlling said drive circuits by the steps of receiving voltage and current information from said PM synchronous motor, determining a rotor position of said PM motor, and generating control signals which control said drive circuits on the basis of said rotor position at zero, low and high motor speeds, wherein for relatively low speeds, said controlling step derives said rotor position on the basis of rotor inductance variations, wherein said inductance variations are determined according to:

$$V_d^r = Ri_d^r + L\frac{d}{dt}i_d^r - L\omega_m i_q^r \tag{1}$$

$$V_q^r = Ri_q^r + L\frac{d}{dt}i_q^r - \Delta L^r \frac{d}{dt}i_q^r + L\omega_m i_d^r + \lambda^r \omega_m \tag{2}$$

Where:

$V_d^r$ and $V_q^r$ are the direct and quadrature voltages.

$i_d^r$ and $i_q^r$ are the direct and quadrature currents.

$\omega_m$ is the mechanical velocity of the rotor.

$\lambda^r$ is the equivalent magnet flux.

L is the average stator winding inductance.

R is the stator resistance.

$\Delta L^r$ is the constant difference between the d-axis and q-axis inductances, due to saliency.

16. The method of claim 15, wherein said controlling step further controls injection of a high frequency excitation voltage into the stator of the motor for amplifying said inductance variations.

17. The method of claim 16, wherein said excitation voltage is reduced as motor speed increases.

18. The method of claim 17, wherein said excitation voltage is controlled according to:

$$V_h = \max\left\{ \begin{array}{c} 0 \\ V_{h\max} + K_{scale}\dfrac{d}{d\bar{\theta}_e}e(\bar{\theta}_e)\Big|_{\bar{\theta}_e=\theta_e} \end{array} \right. \quad (12)$$

19. The method of claim 16, further comprising a step of demodulating a current feedback due to said excitation voltage.

20. The method of claim 19, wherein said demodulation step includes the steps of filtering, a reference frame transformation, and extraction by a PLL.

21. The method of claim 15, wherein at zero and low speeds said controlling step determines the polarity of said rotor position.

22. The method of claim 15, wherein for relatively high motor speeds the controlling step derives said rotor position on the basis of back-EMF.

23. The method of claim 22, wherein a PLL extracts rotor position from the output of a back-EMF observer module.

24. A method of providing position sensorless drive for PM synchronous motors, comprising the steps of:
   providing drive circuits operable for driving a PM synchronous motor; and
   controlling said drive circuits by the steps of receiving voltage and current information from said PM synchronous motor, determining a rotor position of said PM motor, and generating control signals which control said drive circuits on the basis of said rotor position at zero, low and high motor speeds,
   wherein for relatively high motor speeds the controlling step derives said rotor position on the basis of back-EMF,
   wherein estimated back-EMF values are expressed by:

$$\overline{E^s_{\alpha\beta}} \approx \left[ \begin{array}{c} \lambda^r\omega_m\sin(\theta_e) \\ -\lambda^r\omega_m\cos(\theta_e) \end{array} \right]. \quad (9)$$

25. The method of claim 24, wherein said rotor position is expressed by:

$$\bar{\theta}_e = \arctan\left[\dfrac{\lambda^r\omega_m\sin(\theta_e)}{\lambda^r\omega_m\cos(\theta_e)}\right]. \quad (10)$$

26. A method of providing position sensorless drive for PM synchronous motors, comprising the steps of:
   providing drive circuits operable for driving a PM synchronous motor; and
   controlling said drive circuits by the steps of receiving voltage and current information from said PM synchronous motor, determining a rotor position of said PM motor, and generating control signals which control said drive circuits on the basis of said rotor position at zero, low and high motor speeds,
   wherein said controlling step includes:
   a first step of extracting and processing inductance variations and supplying position information at relatively low or zero speeds based thereon; and
   a second step of extracting and processing back-EMF variations and supplying position information at relatively high speeds based thereon,
   wherein said rotor position is related to said inductance and back-EMF variations as follows:

$$V^s_\alpha = Ri^s_\alpha + L\dfrac{d}{dt}i^s_\alpha + \Delta L^r\sin(2\theta_e)\dfrac{d}{dt}i^s_\alpha - L\omega_m i^s_\beta - \lambda^r\omega_m\sin(\theta_e) \quad (3)$$

$$V^s_\beta = Ri^s_\beta + L\dfrac{d}{dt}i^s_\beta - \Delta L^r\cos(2\theta_e)\dfrac{d}{dt}i^r_\beta + L\omega_m i^r_\alpha + \lambda^r\omega_m\cos(\theta_e) \quad (4)$$

wherein $\theta_e$ is the rotor electrical position.

27. A method of providing position sensorless drive for PM synchronous motors, comprising the steps of:
   providing drive circuits operable for driving a PM synchronous motor; and
   controlling said drive circuits by the steps of receiving voltage and current information from said PM synchronous motor, determining a rotor position of said PM motor, and generating control signals which control said drive circuits on the basis of said rotor position at zero, low and high motor speeds,
   wherein said controlling step includes:
   a first step of extracting and processing inductance variations and supplying position information at relatively low or zero speeds based thereon;
   a second step of extracting and processing back-EMF variations and supplying position information at relatively high speeds based thereon, and
   the steps of combining position data output by said first and second steps at all of said zero, low and high speeds and delivering position data for all of said zero, low and high speeds.

28. The method of claim 27, wherein said combining step utilizes respective PLL's for said first and second steps.

* * * * *